(12) United States Patent
Kim (10) Patent No.: US 10,187,599 B2
(45) Date of Patent: *Jan. 22, 2019

(54) PIXEL SIGNAL READOUT DEVICE, METHOD THEREOF, AND CMOS IMAGE SENSOR INCLUDING THE SAME

(71) Applicant: SK hynix Inc., Gyeonggi-do (KR)

(72) Inventor: Tae-Gyu Kim, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 32 days.

This patent is subject to a terminal disclaimer.

(21) Appl. No.: 15/471,494

(22) Filed: Mar. 28, 2017

(65) Prior Publication Data

US 2018/0020176 A1    Jan. 18, 2018

(30) Foreign Application Priority Data

Jul. 13, 2016  (KR) .................. 10-2016-0088500

(51) Int. Cl.
| | |
|---|---|
| H04N 3/14 | (2006.01) |
| H04N 5/335 | (2011.01) |
| H04N 5/378 | (2011.01) |
| H04N 5/374 | (2011.01) |

(52) U.S. Cl.
CPC ............. H04N 5/378 (2013.01); H04N 5/374 (2013.01)

(58) Field of Classification Search
CPC ...... H04N 5/335; H04N 5/363; H04N 5/3559; H04N 5/378; H04N 5/374; H04N 5/3741; H04N 5/3742; H04N 5/3745; H03M 3/496; H03M 3/342
See application file for complete search history.

(56) References Cited

U.S. PATENT DOCUMENTS

| | | | |
|---|---|---|---|
| 6,731,336 B1* | 5/2004 | Shinohara ............ | H04N 5/3658 348/294 |
| 8,659,339 B2 | 2/2014 | Jung et al. | |
| 9,819,886 B2* | 11/2017 | Sato ..................... | H04N 5/3765 |
| 2004/0036643 A1* | 2/2004 | Bock ...................... | G11C 7/06 341/155 |
| 2013/0271633 A1* | 10/2013 | Hashimoto ............ | H04N 5/353 348/300 |
| 2017/0134670 A1* | 5/2017 | Chao ..................... | H04N 5/332 |
| 2017/0244918 A1* | 8/2017 | Sakuragi ............... | H04N 5/363 |
| 2017/0295335 A1* | 10/2017 | Kim ....................... | H04N 5/378 |

FOREIGN PATENT DOCUMENTS

JP      1993-48844    2/1993

* cited by examiner

*Primary Examiner* — Kelly L Jerabek
(74) *Attorney, Agent, or Firm* — IP & T Group LLP (57) ABSTRACT

A pixel signal readout device includes a unit pixel including a drive transistor and a reset transistor; and a column select transistor suitable for outputting a voltage applied to one terminal thereof, to a common terminal of the drive transistor and the reset transistor through the other terminal thereof, in response to a column select control signal applied to a gate terminal thereof.

20 Claims, 4 Drawing Sheets

PIXEL SIGNAL READOUT DEVICE, METHOD THEREOF, AND CMOS IMAGE SENSOR INCLUDING THE SAME

CROSS-REFERENCE TO RELATED APPLICATION

The present application claims priority of Korean patent application Ser. No. 10-2016-0088500, filed on Jul. 13, 2016, which is incorporated herein by reference in its entirety.

TECHNICAL FIELD

Exemplary embodiments relate to a complementary metal oxide semiconductor (CMOS) image sensor (CIS), and more particularly, to a pixel signal readout device and a method thereof, which is capable of decreasing a readout operation to one time by compensating for a difference in a threshold voltage between drive transistors by adding a column selection transistor.

DISCUSSION OF THE RELATED ART

In the field of pixel processing, in order to compensate for a difference (or offset) in threshold voltage due to a difference in manufacturing process between drive transistors each of which is transferring a pixel signal to the output terminal of a unit pixel in a CMOS image sensor (CIS), a readout operation is performed twice for a reset signal and a pixel signal.

For example, in general, in a complementary metal oxide semiconductor CMOS image sensor, in order to remove an offset value that is owned by each pixel itself, pixel signals before and after a light signal is incident are compared such that a pixel signal by the incident light may be measured actually. This technique is referred to as correlated double sampling (CDS).

In this way, in the conventional art, because the value of a threshold voltage between drive transistors is not uniform due to differences in the manufacturing process employed in making the drive transistors, a readout operation should be performed twice. As a consequence, power consumption may be increased, and a data conversion time may be shortened due to an increase in readout time. Furthermore, as a noise characteristic may deteriorate, it is generally difficult to realize a CMOS image sensor with a high resolution.

SUMMARY

Various embodiments of the present invention are directed to a pixel signal readout device and an operation method thereof capable of reading out precisely a pixel signal through a single readout operation. The present invention can compensate for a difference in the threshold voltage between the drive transistors in the plurality of pixel units of a pixel array by adding a column select transistor for each pixel unit. The present invention is also directed to a complementary metal oxide semiconductor (CMOS) image sensor using the pixel signal readout device.

The pixel signal readout device may further include a pixel signal loading line initializer suitable for initializing a pixel signal loading line by using a reference voltage.

The pixel signal readout device may further include a pixel signal loading line initializer suitable for initializing a pixel signal loading line by using a reference voltage.

In an embodiment, a pixel signal readout method may include resetting a photodetector; performing photoelectric conversion by the photodetector; forming a diode connection by a drive transistor with respect to an output node depending on an operation of a column select transistor when resetting a floating diffusion node coupled to the drive transistor; extracting a threshold voltage of the drive transistor; compensating for the extracted threshold voltage by transferring photocharges by the photodetector to the floating diffusion node; and reading out as the compensated threshold voltage as a pixel signal.

In an embodiment, a complementary metal oxide semiconductor (CMOS) image sensor may include a pixel array suitable for outputting pixel signals corresponding to incident light by using a plurality of unit pixels each of which includes a drive transistor and a reset transistor; and a plurality of column select transistors each suitable for outputting a voltage applied to one terminal thereof, to a common terminal of the drive transistor and the reset transistor of a corresponding column through the other terminal thereof, in response to a column select control signal applied to a gate terminal thereof.

The CMOS image sensor may further include a pixel signal loading line initialization unit suitable for initializing pixel signal loading lines of respective columns by using a reference voltage.

BRIEF DESCRIPTION OF THE DRAWINGS

The above and other features and advantages of the present invention will become more apparent to those skilled in the art to which the present invention pertains by the following detailed description with reference to the attached drawings in which.

DETAILED DESCRIPTION

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Throughout the specification, when one element is referred to as being 'connected to' or 'coupled to' another element, it may indicate that the former element is directly connected or coupled to the latter element or electrically connected or coupled to the latter element with another element interposed therebetween. It will be further understood that the terms "comprises," "comprising," "includes," and "including" when used in this specification, specify the presence of the stated elements and do not preclude the presence or addition of one or more other elements. Furthermore, although components described in the specification are represented in the form of a singular form, the present embodiment is not limited thereto, but the corresponding components can also be represented in the form of a plural form.

Figure 1A:
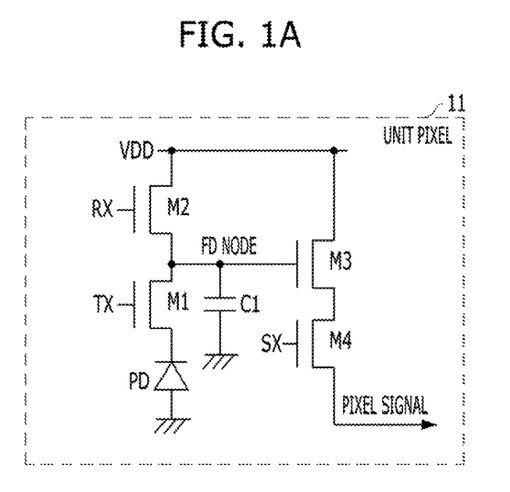
FIG. 1A is a circuit diagram illustrating a unit pixel.
Figure 1B:
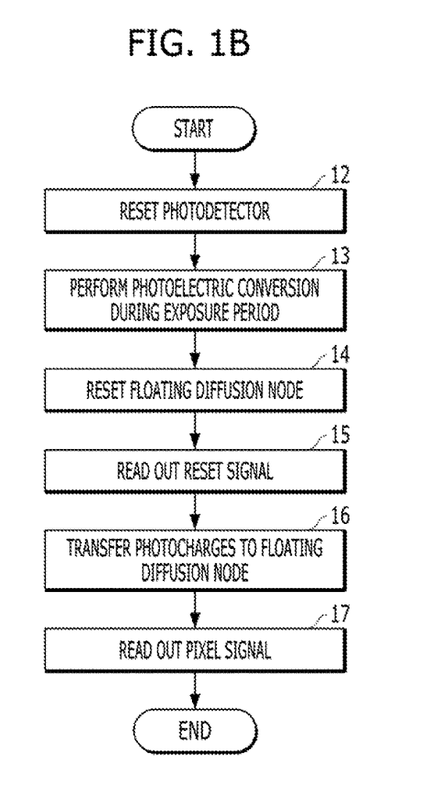
FIG. 1B is a flow chart illustrating an operation method of the unit pixel.
Figure 1C:
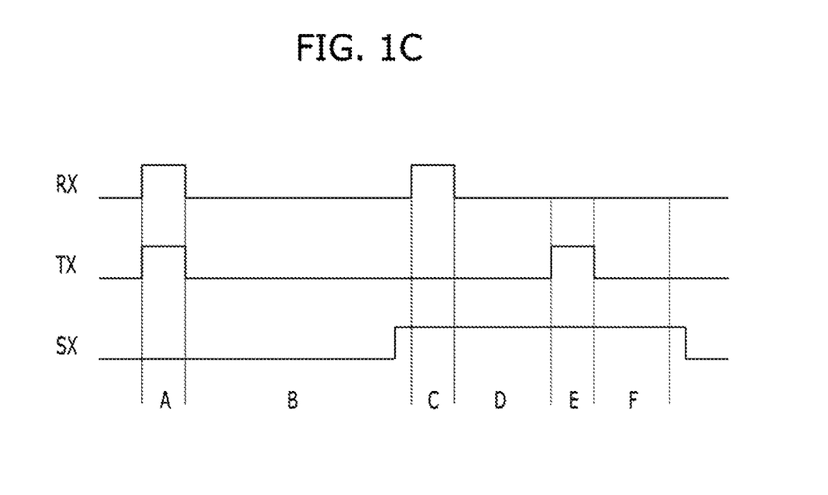
FIG. 1C is a waveform diagram illustrating signals used in the unit pixel.

FIG. 1A is a circuit diagram illustrating a unit pixel 11, FIG. 1B is a flow chart illustrating an operation method of the unit pixel 11, and FIG. 1C is a waveform diagram illustrating signals used in the unit pixel 11.

Referring to FIG. 1A, the unit pixel 11 may include a photodetector PD, a transfer transistor M1, a reset transistor M2, a drive transistor M3, and a select transistor M4.

The photodetector PD may perform a photoelectric conversion function. For example, the photodetector PD may receive light from an exterior object, and generate photocharges based on the received light. The photodetector PD may be turned on or off in response to a control signal received from a control unit (not shown). When the photodetector PD is in a turned-on state, the photodetector PD may detect incident light and generate photocharges. Conversely, when the photodetector PD is in a turned-off state, the photodetector PD does not detect incident light. The photodetector PD may be implemented by using any one among a photodiode, a phototransistor, a photogate, a pinned photodiode, and a combination thereof.

The transfer transistor M1 may transfer the photocharges of the photodetector PD coupled to one terminal thereof to a floating diffusion (FD) node coupled to the other terminal thereof, in response to a transfer control signal TX applied to the gate terminal thereof.

The reset transistor M2 may transfer a power supply voltage VDD applied through one terminal thereof to the floating diffusion node coupled to the other terminal thereof, in response to a reset control signal RX applied to the gate terminal thereof. In other words, the reset transistor M2 may reset the photocharges stored in the floating diffusion node, in response to the reset control signal RX. The power supply voltage VDD applied to the drain terminal of the reset transistor M2 may serve as an initialization voltage of the reset transistor M2.

The drive transistor M3 may be coupled to the power supply voltage VDD through one terminal thereof, generate an electrical signal corresponding to the charges accumulated in the floating diffusion node which is coupled with the gate terminal thereof, and output the electrical signal through the other terminal thereof. The drive transistor M3 may function as a source follower buffer amplifier.

The select transistor M4 may operate in response to a select control signal SX applied to the gate terminal thereof, and output the electrical signal from the drive transistor M3, applied to one terminal thereof, through the other terminal thereof, as a pixel signal. The select transistor M4 may perform a switching operation and an address operation for selecting the unit pixel 11, in response to the select control signal SX.

Since the floating diffusion node, as a diffusion region which constructs in common the other terminals of the transfer transistor M1 and the reset transistor M2, is accumulated with charges corresponding to an image signal or charges corresponding to the initialization voltage, the floating diffusion node may be modeled as a capacitor C1 intrinsic to the floating diffusion node.

Next, an operation method of the unit pixel 11 will be described below with reference to FIGS. 1B and 1C.

First, during a period A of FIG. 1C in which the transfer control signal TX and the reset control signal RX are enabled, the photodetector PD is reset (12 in FIG. 1B). Namely, when the transfer control signal TX has a high level, the transfer transistor M1 is turned on, and accordingly, the photocharges left in the photodetector PD are transferred to the floating diffusion node. Also, when the reset control signal RX has a high level, the reset transistor M2 is turned on, and accordingly, the photocharges transferred to and stored in the floating diffusion node are reset.

Thereafter, the photodetector PD performs the photoelectric conversion function during an exposure period B (13 in FIG. 1B). For example, the photodetector PD receives incident light from an exterior object and generates photocharges corresponding thereto.

Then, during a period C of FIG. 1C in which the select control signal SX is enabled and the reset control signal RX is enabled, the floating diffusion node is reset (14 in FIG. 1B). In other words, after the select transistor M4 is turned on in response to the select control signal SX with a high level, as the reset transistor M2 is turned on in response to the reset control signal RX with the high level, the photocharges stored in the floating diffusion node are reset with a predetermined cycle for a correlated double sampling (CDS) operation.

After that, during a reset signal readout period D of FIG. 1C in which the select control signal SX is enabled, a reset signal is read out (15 in FIG. 1B). Namely, the drive transistor M3 generates an electrical signal corresponding to the charges (i.e., charges upon reset) accumulated in the floating diffusion node coupled to the gate terminal thereof, and outputs the electrical signal as the reset signal.

Then, during a period E of FIG. 1C in which the select control signal SX is enabled and the transfer control signal TX is enabled, photocharges corresponding to an image signal are transferred to the floating diffusion node (16 in FIG. 1B). That is to say, when the transfer control signal TX has the high level, the transfer transistor M1 is turned on, and accordingly, the photocharges generated in the photodetector PD are transferred to the floating diffusion node.

Thereafter, during a pixel signal readout period F of FIG. 1C in which the select control signal SX is enabled, a pixel signal is read out (17 in FIG. 1B). In other words, the drive transistor M3 generates an electrical signal corresponding to the charges (i.e., charges corresponding to an image signal) accumulated in the floating diffusion node coupled to the gate terminal thereof, and outputs the electrical signal as the pixel signal.

As described above, in the unit pixel of FIG. 1A, in order to compensate for a difference (or offset) in the threshold voltage between drive transistors due to differences in the manufacturing process, a readout operation is performed twice for a reset signal and a pixel signal. Namely, after resetting the floating diffusion node, an operation of reading in a reset signal is performed, and then, after transferring photocharges to the floating diffusion node by turning on the transfer transistor M1, a pixel signal is read in.

In this way, in the unit pixel of FIG. 1A, because the value of a threshold voltage is not uniform due to a difference in manufacturing process between drive transistors, different voltage values are outputted from respective columns. In order to compensate for this, correlated double sampling (CDS) should be essentially implemented by performing a readout operation twice. As a consequence, power consumption increases, and a data conversion time is reduced due to an increase in readout time. Due to this fact, the noise characteristic may deteriorate making it difficult to implement a CMOS image sensor with a high resolution.

In an embodiment of the present disclosure, a column select transistor is added for compensating for a difference in the threshold voltage between drive transistors. This way, it is possible to read out precisely a pixel signal through a single readout operation (i.e., read out operation performed once for each pixel signal data). This will be described below in further detail with reference to FIGS. 2A to 2C.

Figure 2A:
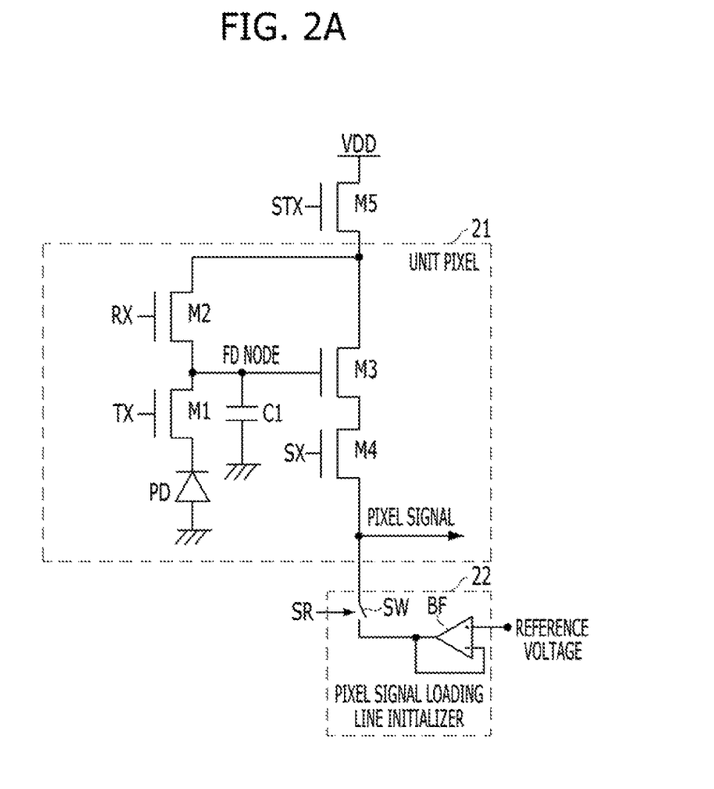
FIG. 2A is a circuit diagram illustrating a pixel signal readout device in accordance with an embodiment of the present invention.
Figure 2B:
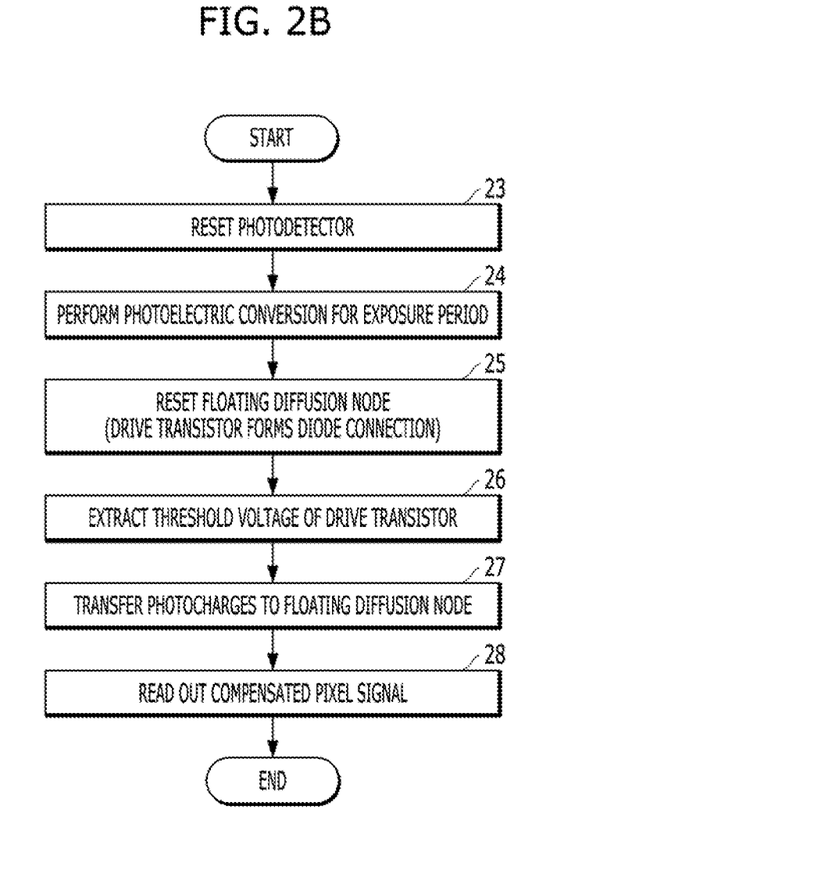
FIG. 2B is a flow chart illustrating a pixel signal readout method in accordance with an embodiment of the present invention.
Figure 2C:
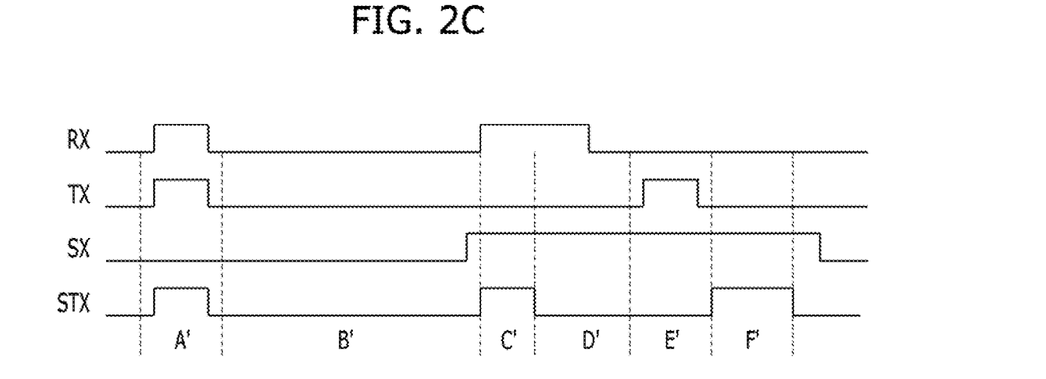
FIG. 2C is a waveform diagram illustrating signals used in the pixel signal readout device in accordance with an embodiment.

FIG. 2A is a circuit diagram illustrating a pixel signal readout device in accordance with an embodiment, FIG. 2B is a flow chart illustrating a pixel signal readout method in accordance with an embodiment, and FIG. 2C is a waveform diagram illustrating signals used in the pixel signal readout device in accordance with the illustrated embodiment.

Referring to FIG. 2A, the pixel signal readout device may include a column select transistor M5 and a unit pixel 21. The pixel signal readout device may further include a pixel signal loading line initializer 22. The unit pixel 21 may include a photodetector PD, a transfer transistor M1, a reset transistor M2, a drive transistor M3, and a select transistor M4.

The photodetector PD may generate photocharges corresponding to incident light. Since the detailed configuration and operation of the photodetector PD are as described above with reference to FIG. 1A, further descriptions thereof will be omitted herein.

The transfer transistor M1 may transfer the photocharges of the photodetector PD coupled to the source terminal thereof to a floating diffusion (FD) node coupled to the drain terminal thereof, in response to a transfer control signal TX applied to the gate terminal thereof.

The reset transistor M2 may transfer a power supply voltage VDD applied to the drain terminal thereof from the source terminal of the column select transistor M5, to the floating diffusion node coupled to the source terminal thereof, in response to a reset control signal RX applied to the gate terminal thereof. In other words, the reset transistor M2 may reset the photocharges stored in the floating diffusion node, in response to the reset control signal RX.

The drive transistor M3 may be coupled to the source terminal of the column select transistor M5 through the drain terminal thereof, generate an electrical signal corresponding to the charges accumulated in the floating diffusion node coupled with the gate terminal thereof, and output the electrical signal to the drain terminal of the select transistor M4 through the source terminal thereof.

The drive transistor M3 may form a diode connection with respect to an output node, and extract a threshold voltage. For example, in a state in which the diode connection is formed as the reset transistor M2 is turned on in response to the reset control signal RX with a high level, the select transistor M4 is turned on in response to a select control signal SX with a high level and the column select transistor M5 is turned on in response to a column select control signal STX with a high level, if the column select transistor M5 is turned off in response to the column select control signal STX with a low level, the voltage of the gate terminal of the drive transistor M3 converges to a value larger by a threshold voltage in comparison with the voltage of the output node.

The select transistor M4 may operate in response to the select control signal SX applied to the gate terminal thereof. The select transistor M4 may output the electrical signal received from the drive transistor M3 as a pixel signal to the output node. The electrical signal from the drive transistor M3 is being applied to the drain terminal of the select transistor M4 through the source terminal of the select transistor M4. The select transistor M4 may perform a switching operation and an address operation for selecting the unit pixel 21, in response to the select control signal SX.

The column select transistor M5 may be coupled to the power supply voltage VDD through the drain terminal thereof. The column select transistor M5 may also be coupled to the drain terminals of the reset transistor M2 and the drive transistor M3 through the source terminal thereof. The column select transistor M5 may operate in response to the column select control signal STX applied to the gate terminal thereof and may output the power supply voltage VDD to the drain terminals of the reset transistor M2 and the drive transistor M3.

The pixel signal loading line initializer 22 may initialize a pixel signal loading line of the output node by using a reference voltage. In other words, the pixel signal loading line initializer 22 may initialize the pixel signal loading line to a predetermined reference voltage value by using the reference voltage applied from an external reference voltage generator (not shown) such that the threshold voltage value of the drive transistor M3 may be defined as a difference value in comparison with the predetermined reference voltage value. By doing this, a data value may be positioned within a predictable region and processing convenience may be improved.

The pixel signal loading line initializer 22 may include a buffer BF and a pixel signal loading line initialization switch SW. The buffer BF may receive the reference voltage from the external reference voltage generator and transfer the reference voltage. The pixel signal loading line initialization switch SW may operate in response to an initialization control signal SR and supply the reference voltage from the buffer BF, to the pixel signal loading line.

The column select control signal STX and the initialization control signal SR may be received from an external control unit (for example, a timing generator) or a row decoder.

Since the floating diffusion node, as a diffusion region which constructs in common the drain terminal of the transfer transistor M1 and the source terminal of the reset transistor M2, is accumulated with charges corresponding to an image signal or charges corresponding to the initialization voltage, the floating diffusion node may be modeled as a capacitor C1 intrinsic to the floating diffusion node.

Next, an operation method of the pixel signal readout device shown in FIG. 2A will be described below with reference to FIGS. 2B and 2C.

First, during a period A' of FIG. 2C in which the transfer control signal TX, the reset control signal RX and the column select control signal STX are enabled, the photodetector PD is reset (23 in FIG. 2B). Namely, when the transfer control signal TX has a high level, the transfer transistor M1 is turned on, and accordingly, the photocharges left in the photodetector PD are transferred to the floating diffusion node. Also, when the column select control signal STX has the high level, the column select transistor M5 is turned on, and accordingly, the power supply voltage VDD is applied to the drain terminals of the reset transistor M2 and the drive transistor M3. Moreover, when the reset control signal RX has the high level, the reset transistor M2 is turned on, and accordingly, the power supply voltage VDD is transferred to the floating diffusion node and the photocharges stored therein are reset.

Thereafter, the photodetector PD performs a photoelectric conversion function during an exposure period B' of FIG. 2C (24 in FIG. 2B). That is, during the exposure period B', the photodetector PD receives light from an exterior object and generates photocharges corresponding to the incident light.

Then, during a period C' of FIG. 2C in which the column select control signal STX is enabled, the reset control signal RX is enabled, the select control signal SX is enabled, and the transfer control signal Tx is disabled, the floating diffusion node is reset (25 in FIG. 2B). In this regard, after the column select transistor M5 is turned on in response to the column select control signal STX with the high level, the reset transistor M2 is turned in response to the reset control signal RX with the high level, and the select transistor M4 is turned on in response to the select control signal SX with the high level, then the drive transistor M3 forms the diode connection with respect to the output node.

Then, during a period D' of FIG. 2C in which the reset control signal RX is enabled, the select control signal SX is enabled and the column select control signal STX is disabled and the threshold voltage of the drive transistor M3 is extracted (26 in FIG. 2B). For example, in a state in which the reset transistor M2 is turned on in response to the reset control signal RX with the high level and the select transistor M4 is turned on in response to the select control signal SX with the high level, if the column select transistor M5 is turned off in response to the column select control signal STX with the low level, the voltage of the gate terminal of the drive transistor M3 converges to a value larger by the threshold voltage in comparison with the voltage of the output node.

Then, during a period E' of FIG. 2C in which the select control signal SX remains enabled, the column select control signal STX remains disabled, the reset control signal RX remains disabled, and the transfer control signal TX is enabled, and photocharges corresponding to an image signal via the photodetector PD are transferred to the floating diffusion node through the transfer transistor M1 and the extracted threshold voltage is compensated by the photocharges (27 in FIG. 2B). For example, after the reset transistor M2 is turned off in response to the reset control signal RX with a low level, in a state in which the select transistor M4 is turned on in response to the select control signal SX with the high level, if the transfer transistor M1 is turned on in response to the transfer control signal TX with the high level, photocharges corresponding to an image signal are transferred from the photodetector PD to the floating diffusion node through the transfer transistor M1, and the voltage of the gate terminal of the drive transistor M3 is changed based on the extracted threshold voltage.

Then, at the end of the E' period the transfer control signal is being disabled. Thereafter, during a pixel signal readout period F' of FIG. 2C in which the select control signal SX remains enabled, the column select control signal STX is enabled and a compensated pixel signal is read out (28 in FIG. 2B). In other words, the drive transistor M3 generates an electrical signal corresponding to the charges (i.e., charges corresponding to an image signal) accumulated in the floating diffusion node coupled to the gate terminal thereof, and outputs the electrical signal as the pixel signal.

Meanwhile, after resetting the photodetector PD (23 in FIG. 2B), the pixel signal loading line initializer 22 may additionally perform the process of initializing the pixel signal loading line by using the reference voltage. Namely, if the pixel signal loading line initialization switch SW is turned on in response to the initialization control signal SR with a high level, the reference voltage generated from the external reference voltage generator is applied and initializes the pixel signal loading line to the predetermined reference voltage value.

If operations are performed as described above, because a pixel signal which is dropped by the threshold voltage of the drive transistor M3 is outputted, a readout operation that is otherwise performed twice to compensate for a difference (offset) in threshold voltage due to a difference in manufacturing process between drive transistors may be reduced to a simpler process that needs to be performed once, i.e., a one time process.

As a consequence, a data conversion speed may be increased due to a decrease in readout time, power consumption may be reduced, and a noise characteristic may be improved.

While FIG. 2A illustrates the unit pixel 21 which includes one photodetector PD and four NMOS transistors M1 to M4, it is to be noted that the embodiment is not limited thereto and may be applied to unit pixels of various patterns. In addition, the embodiment may be implemented by design-changing the NMOS transistors M1 to M4 into PMOS transistors.

Figure 3:
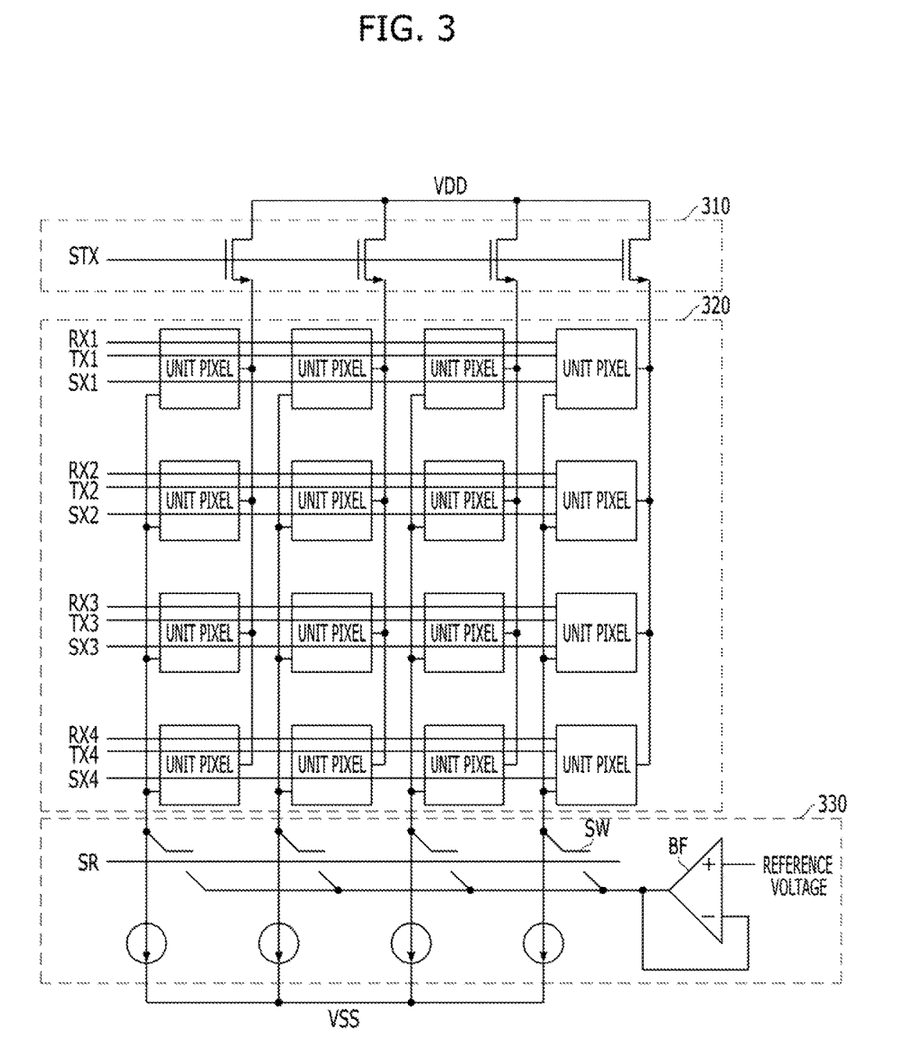
FIG. 3 is a diagram illustrating a CMOS image sensor to which a pixel signal readout device is applied in accordance with an embodiment of the present invention.

FIG. 3 is a diagram illustrating a CMOS image sensor (CIS) to which the pixel signal readout device in accordance with an embodiment is applied.

Referring to FIG. 3, the CMOS image sensor may include a plurality of column select transistors 310 and a pixel array 320. The CMOS image sensor may further include a pixel signal loading line initialization unit 330.

The pixel array 320 may output pixel signals corresponding to incident light by using a plurality of unit pixels each of which may include a drive transistor and a reset transistor as shown in FIG. 2A.

Each of the plurality of column select transistors 310 may operate in response to a column select control signal STX applied to the gate terminal thereof, and output a power supply voltage VDD applied through one terminal thereof, to a common a common terminal of the drive transistor and the reset transistor of a unit pixel of a corresponding column through the other terminal thereof.

The pixel signal loading line initialization unit 330 may initialize the pixel signal loading line of each column by using a reference voltage. The pixel signal loading line initialization unit 330 may include a buffer BF, a plurality of pixel signal loading line initialization switches SWs, and a plurality of current sources ISs. The buffer BF may receive the reference voltage from an external reference voltage generator and transfer the reference voltage. The plurality of pixel signal loading line initialization switches SWs may operate in response to an initialization control signal SR and supply the reference voltage from the buffer BF, to the pixel signal loading lines of respective columns. The plurality of current sources ISs may supply current to the pixel signal loading lines of the respective columns.

According to the illustrated embodiments, by compensating for a difference in the threshold voltage between drive transistors through adding a column select transistor, it is possible to read out precisely a pixel signal through a single readout operation that is performed one time.

Further, according to the illustrated embodiments, by performing a single, i.e., a one-time readout operation, a data conversion time may be lengthened due to a decrease in readout time, power consumption may be reduced, and a noise characteristic may be improved.

As a consequence, when using the pixel signal readout device and the method thereof according to various embodiments of the present invention, it is possible to more readily realize a CMOS image sensor with a high resolution.

Although various embodiments have been described for illustrative purposes, it will be apparent to those skilled in the art that various other embodiments, changes and/or modifications thereof may be made without departing from the spirit and scope of the invention as defined in the following claims.

What is claimed is:

1. A pixel signal readout device comprising:
   a unit pixel including a drive transistor and a reset transistor; and
   a column select transistor suitable for outputting a voltage applied to one terminal thereof, to a common terminal of the drive transistor and the reset transistor through the other terminal thereof, in response to a column select control signal applied to a gate terminal thereof.

2. The pixel signal readout device according to claim 1, wherein the unit pixel comprises:
   a photodetector;
   the reset transistor suitable for transferring the voltage from the other terminal of the column select transistor, to a floating diffusion node coupled to the other terminal thereof, in response to a reset control signal applied to a gate terminal thereof;
   a transfer transistor suitable for transferring photocharges of the photodetector coupled to one terminal thereof, to the floating diffusion node coupled to the other terminal thereof, in response to a transfer control signal applied to a gate terminal thereof;
   the drive transistor coupled to the other terminal of the column select transistor through the one terminal thereof, and suitable for generating an electrical signal corresponding to charges accumulated in the floating diffusion node coupled to a gate terminal thereof and outputting the electrical signal through the other terminal thereof; and
   a select transistor suitable for outputting the electrical signal from the drive transistor, applied to one terminal thereof, through the other terminal thereof, as a pixel signal, in response to a select control signal applied to a gate terminal thereof.

3. The pixel signal readout device according to claim 2, wherein the photodetector generates photocharges corresponding to incident light,
   wherein the transfer transistor transfers the photocharges of the photodetector coupled to a source terminal thereof, to the floating diffusion node coupled to a drain terminal thereof, in response to the transfer control signal;
   wherein the reset transistor transfers the voltage applied to a drain terminal thereof from a source terminal of the column select transistor, to the floating diffusion node coupled to a source terminal thereof, in response to the reset control signal, and thereby resets the floating diffusion node,
   wherein the drive transistor is coupled to the source terminal of the column select transistor through a drain terminal thereof, generates an electrical signal corresponding to charges accumulated in the floating diffusion node, and outputs the electrical signal through a source terminal thereof to a drain terminal of the select transistor, and
   wherein the select transistor, in response to the select control signal, outputs the electrical signal, applied to the drain terminal thereof, through a source terminal thereof, as the pixel signal.

4. The pixel signal readout device according to claim 2, wherein the drive transistor extracts a threshold voltage by forming a diode connection with respect to an output node.

5. The pixel signal readout device according to claim 4, wherein, in a state in which a diode connection is formed as the reset transistor is turned on in response to the reset control signal with a high level, the select transistor is turned on in response to a select control signal with a high level and the column select transistor is turned on in response to the column select control signal with a high level,
   if the column select transistor is turned off in response to the column select control signal with a low level, a voltage of the gate terminal of the drive transistor converges by the threshold voltage in comparison with a voltage of the output node.

6. The pixel signal readout device according to claim 1, further comprising:
   a pixel signal loading line initializer suitable for initializing a pixel signal loading line by using a reference voltage.

7. The pixel signal readout device according to claim 6, wherein the pixel signal loading line initializer comprises:
   a buffer suitable for receiving the reference voltage from an external reference voltage generator, and transferring the reference voltage; and
   a pixel signal loading line initialization switch suitable for, in response to an initialization control signal, supplying the reference voltage from the buffer, to the pixel signal loading line.

8. The pixel signal readout device according to claim 1, wherein the column select transistor operates in response to the column select control signal, and outputs a voltage applied to a drain terminal thereof, to the drain terminals of the reset transistor and the drive transistor, through a source terminal thereof.

9. A pixel signal readout method comprising:
   resetting a photodetector;
   performing photoelectric conversion by the photodetector;
   forming a diode connection by a drive transistor with respect to an output node depending on an operation of a column select transistor when resetting a floating diffusion node coupled to the drive transistor;
   extracting a threshold voltage of the drive transistor;
   compensating for the extracted threshold voltage by transferring photocharges by the photodetector to the floating diffusion node; and
   reading out the compensated threshold voltage as a pixel signal.

10. The pixel signal readout method according to claim 9, wherein, in the resetting of the photodetector, the photodetector is reset during a period in which a transfer control signal, a reset control signal and a column select control signal are enabled.

11. The pixel signal readout method according to claim 10, wherein, in the forming of the diode connection, after the column select transistor is turned on in response to the column select control signal with a high level,
   if a reset transistor is turned on in response to the reset control signal with a high level and a select transistor is turned on in response to a select control signal with a high level,
   the drive transistor forms the diode connection with respect to the output node.

12. The pixel signal readout method according to claim 11, wherein, in the extracting of the threshold voltage, in a state in which the reset transistor is turned on in response to the reset control signal with the high level and the select transistor is turned on in response to the select control signal with the high level, if the column select transistor is turned off in response to the column select control signal with a low level, a voltage of a gate terminal of the drive transistor converges by the threshold voltage in comparison with a voltage of the output node.

13. The pixel signal readout method according to claim 11, wherein, in the compensating for the extracted threshold voltage, after the reset transistor is turned off in response to the reset control signal with a low level, if a transfer transistor is turned on in response to a transfer control signal with a high level in a state in which the select transistor is turned on in response to the select control signal with the high level, photocharges corresponding to an image signal are transferred from the photodetector to the floating diffusion node, and the voltage of the gate terminal of the drive transistor is changed based on the extracted threshold voltage.

14. The pixel signal readout method according to claim 9, further comprising:

initializing a pixel signal loading line by using a reference voltage.

15. A complementary metal oxide semiconductor (CMOS) image sensor comprising:

a pixel array suitable for outputting pixel signals corresponding to incident light by using a plurality of unit pixels each of which includes a drive transistor and a reset transistor; and a plurality of column select transistors each suitable for outputting a voltage applied to one terminal thereof, to a common terminal of the drive transistor and the reset transistor of a corresponding column through the other terminal thereof, in response to a column select control signal applied to a gate terminal thereof.

16. The CMOS image sensor according to claim 15, further comprising:

a pixel signal loading line initialization unit suitable for initializing pixel signal loading lines of respective columns by using a reference voltage.

17. The CMOS image sensor according to claim 16, wherein the pixel signal loading line initialization unit comprises:

a buffer suitable for receiving the reference voltage from an external reference voltage generator, and transferring the reference voltage;

a plurality of pixel signal loading line initialization switches suitable for, in response to an initialization control signal, supplying the reference voltage from the buffer, to the pixel signal loading lines of the respective columns; and a plurality of current sources suitable for supplying current to the pixel signal loading lines of the respective columns.

18. The CMOS image sensor according to claim 15, wherein the drive transistor extracts a threshold voltage by forming a diode connection with respect to an output node.

19. The CMOS image sensor according to claim 15, wherein, in a state in which a diode connection is formed as the reset transistor is turned on in response to the reset control signal with a high level, the select transistor is turned on in response to a select control signal with a high level and the column select transistor is turned on in response to the column select control signal with a high level, if the column select transistor is turned off in response to the column select control signal with a low level, a voltage of the gate terminal of the drive transistor converges by the threshold voltage in comparison with a voltage of the output node.

20. The CMOS image sensor according to claim 15, wherein each of the plurality of column select transistors, in response to the column select control signal applied to the gate terminal thereof, outputs a voltage applied to a drain terminal thereof, to the drain terminals of the reset transistor and the drive transistor, through a source terminal thereof.

* * * * *